US010793279B2

(12) United States Patent
Sharpe et al.

(10) Patent No.: US 10,793,279 B2
(45) Date of Patent: Oct. 6, 2020

(54) CABIN BLOWER SYSTEM

(71) Applicant: ROLLS-ROYCE PLC, London (GB)

(72) Inventors: Richard Sharpe, Leek (GB); Glenn A Knight, Belper (GB)

(73) Assignee: ROLLS-ROYCE plc, London (GB)

(*) Notice: Subject to any disclaimer, the term of this patent is extended or adjusted under 35 U.S.C. 154(b) by 108 days.

(21) Appl. No.: 16/238,841

(22) Filed: Jan. 3, 2019

(65) Prior Publication Data
US 2019/0233124 A1 Aug. 1, 2019

(30) Foreign Application Priority Data

Jan. 26, 2018 (GB) .................................. 1801301.1

(51) Int. Cl.
B64D 13/02 (2006.01)
F02C 7/32 (2006.01)
(Continued)

(52) U.S. Cl.
CPC ............ B64D 13/02 (2013.01); B64D 41/00 (2013.01); F01D 15/10 (2013.01); F02C 7/275 (2013.01);
(Continued)

(58) Field of Classification Search
CPC ......... B64D 13/02; B64D 41/00; F01D 15/10; F02C 7/275; F02C 7/36; F02C 7/32; F04D 13/02; F04D 13/021; F04D 27/004; F04D 29/05; F05D 2240/40; F05D 2220/323; F05D 2220/76
(Continued)

(56) References Cited

U.S. PATENT DOCUMENTS 5,125,806 A    6/1992 Quick et al.
10,208,675 B2  2/2019 Mackin
(Continued)

FOREIGN PATENT DOCUMENTS

EP    1477705 A1   11/2004
EP    2 584 172 A2  4/2013
(Continued)

OTHER PUBLICATIONS

May 17, 2019 Search Report issued in European Patent Application No. 18214429.5.
(Continued)

Primary Examiner — Jessica Yuen
(74) Attorney, Agent, or Firm — Oliff PLC

(57) ABSTRACT

An aircraft cabin blower system includes: a transmission configured to receive mechanical power from a first part of a gas turbine engine in the form of a first transmission input; and an electrical circuit including a first electrical machine, a second electrical machine, and a power management system, wherein an output of the transmission is configured to drive a cabin blower compressor when operating in a blower mode, the first electrical machine being configured to receive mechanical power from a second part of the gas turbine engine and act as a generator to provide electrical power to the power management system, and the second electrical machine being configured to act as a motor providing mechanical power to the transmission in the form of a second transmission input, the second electrical machine being driven by electrical power from the power management system.

19 Claims, 5 Drawing Sheets

(51) Int. Cl.
  *B64D 41/00* (2006.01)
  *F01D 15/10* (2006.01)
  *F02C 7/275* (2006.01)
  *F04D 13/02* (2006.01)
  *F04D 27/00* (2006.01)
  *F04D 29/05* (2006.01)

(52) U.S. Cl.
  CPC .............. *F02C 7/32* (2013.01); *F04D 13/021* (2013.01); *F04D 27/004* (2013.01); *F04D 29/05* (2013.01); *F05D 2220/323* (2013.01); *F05D 2220/76* (2013.01); *F05D 2240/40* (2013.01)

(58) Field of Classification Search
  USPC .......................................................... 454/76
  See application file for complete search history.

(56) References Cited

U.S. PATENT DOCUMENTS

| | | |
|---|---|---|
| 2004/0161340 A1 | 8/2004 | Rimkus et al. |
| 2006/0034693 A1 | 2/2006 | Lardellier |
| 2012/0153076 A1 | 6/2012 | Burns et al. |
| 2015/0275769 A1 | 10/2015 | Foutch et al. |
| 2016/0032841 A1 | 2/2016 | Ronan |
| 2016/0167789 A1 | 6/2016 | Knight et al. |
| 2016/0167790 A1 | 6/2016 | Hipsky et al. |
| 2016/0355270 A1 | 12/2016 | Bruno et al. |
| 2017/0113808 A1 | 4/2017 | Bond |
| 2017/0284408 A1 | 10/2017 | Ricordeau et al. |
| 2017/0370242 A1 | 12/2017 | Bacic et al. |
| 2018/0009536 A1 | 1/2018 | Christopherson et al. |
| 2019/0077514 A1 | 3/2019 | Silet et al. |

FOREIGN PATENT DOCUMENTS

| | | |
|---|---|---|
| EP | 3 023 625 A1 | 5/2016 |
| EP | 3 034 405 A1 | 6/2016 |
| GB | 621123 A | 4/1949 |
| GB | 686547 A | 1/1953 |
| GB | 2549597 A | 10/2017 |
| WO | 2017/168074 A1 | 10/2017 |

OTHER PUBLICATIONS

Apr. 25, 2019 Search Report issued in European Patent Application No. 18214432.

May 24, 2019 Extended Search Report issued in European Patent Application No. 18214437.8.

Jul. 20, 2018 Search Report issued in British Patent Application No. 1801298.9.

Jul. 19, 2018 Search Report issued in British Patent Application No. 1801300.3.

Jul. 20, 2018 Search Report issued in British Patent Application No. 1801301.1.

U.S. Appl. No. 16/238,700, filed Jan. 3, 2019 in the name of Sharpe et al.

U.S. Appl. No. 16/239,338, filed Jan. 3, 2019 in the name of Knight et al.

Jul. 10, 2020 Office Action Issued in U.S. Appl. No. 16/238,700.

CABIN BLOWER SYSTEM

The present disclosure concerns cabin blower systems. More specifically the disclosure concerns cabin blower systems with drive from two parts of a gas turbine engine. The disclosure also concerns aircraft having cabin blower systems and methods of operating cabin blower systems.

Cabin blower systems are used to pressurise the cabins of aircraft. Cabin blowers are typically driven by one or more associated gas turbine engines of the aircraft. The gas turbine engine may be used to drive a cabin blower compressor in a number of ways (e.g. using electrical power generated by the engine or mechanically). Where mechanical driving of the compressor is employed, drive is typically taken from a shaft of the gas turbine engine via an accessory gearbox. A means of varying the speed of the drive delivered to the compressor is also required; it is not desirable for the cabin air flow and pressure to be determined by the particular operating point of the gas turbine at any particular moment. Therefore a gearing mechanism such as a continuously variable transmission is also provided in the drive path between the accessory gearbox and compressor. This system ensures that regardless of engine operating point and ambient air pressure the cabin flow and pressure can be maintained within acceptable limits.

Known compressors of cabin blower systems may be operated from a single initial power source, such as an auxiliary power unit or a shaft of the gas turbine engine. However, such an arrangement can limit the flexibility of operations using the cabin blower system. As such, a more flexible arrangement is sought.

According to a first aspect, there is provided an aircraft cabin blower system comprising: a first transmission configured to receive mechanical power from a first part of a gas turbine engine in the form of a first transmission input; and an electrical circuit comprising a first electrical machine, a second electrical machine, and a power management system, wherein an output of the first transmission is configured to drive a cabin blower compressor when operating in a blower mode, the first electrical machine being configured to receive mechanical power from a second part of the gas turbine engine and act as a generator to provide electrical power to the power management system, and the second electrical machine being configured to act as a motor providing mechanical power to the first transmission in the form of a second transmission input, the second electrical machine being driven by electrical power from the power management system.

The first part of the gas turbine engine provides a first source of power to the transmission whilst the second part of the gas turbine engine provides a second source of power to the first electrical machine. Power extraction from different parts of the gas turbine engine can result in the parts of the aircraft cabin blower system being driven at different speeds which may be beneficial to their operation, for example through enhanced efficiency.

The first part of the gas turbine engine may be a shaft associated with a first fan, e.g. a propulsive fan, or compressor. The second part of the gas turbine engine may be a shaft associated with a second fan, e.g. a propulsive fan, or compressor. The first fan or compressor may be at a different pressure stage from the second fan or compressor.

The first part of the gas turbine engine may be a shaft associated with an intermediate-pressure compressor and/or the second part of the gas turbine engine may be a shaft associated with a high-pressure compressor. In this case, the system may comprise a second transmission which may be configured to provide any one of a plurality of discrete gear ratios of the second transmission, the second transmission being arranged to transmit mechanical power from the first part of the gas turbine engine to the first transmission input in the blower mode.

Alternatively, the first part of the gas turbine engine may be a shaft associated with a high-pressure compressor and/or the second part of the gas turbine engine may be a shaft associated with an intermediate-pressure compressor.

For example, the majority of the power may be taken from the intermediate-pressure shaft. Power extraction from the intermediate-pressure shaft may be beneficial to operability. For example, extracting power from the intermediate-pressure shaft allows the high-pressure shaft to run at its optimum speed without constraint by the requirement to run an accessory gearbox.

In embodiments that extract power from the high-pressure shaft, the gas turbine engine may be able to be started through use of the high-pressure shaft.

The use of electric machines may limit gear speed and therefore moving the generator out of the main transmission may allow the generator to run faster, so the generator can be smaller and lighter.

Having the generator running from the high-pressure shaft may be beneficial to operability and thus the generator speed ratio may be lower and the electronics accordingly less complex. The lower speed ratio may reduce the necessary size of the electronics and generator. Where generator shaft speed results in a frequency dissimilar to that required by the aircraft electrical system, power electronics are required to electrically correct the generator frequency. The greater the speed variance, the more power electronics—capacitors and inductors are generally large and heavy—are required for correction. The high-pressure shaft may have a speed ratio (max:min) of around 1.7:1 compared to the intermediate-pressure shaft having a speed ratio of around 6:1, the intermediate-pressure shaft therefore being less attractive for accessory drive.

When operating in the blower mode, the speed of the output of the first transmission may be determined by a relative difference of the mechanical power provided from the gas turbine engine and the second electrical machine to the first transmission.

The aircraft cabin blower system may be further operable in a starter mode, wherein, when operating in the starter mode, the first electrical machine is configured to act as a motor to provide mechanical power to the gas turbine engine to facilitate starting of the gas turbine engine, the first electrical machine being driven by electrical power from the power management system.

The aircraft cabin blower system may further be operable in a starter mode, wherein, when operating in the starter mode, the second electrical machine is configured to act as a motor to provide mechanical power to the gas turbine engine to facilitate starting of the gas turbine engine, the second electrical machine being driven by electrical power from the power management system.

The system may comprise first and second accessory gearboxes arranged to transmit mechanical power from the first and second parts of the gas turbine engine respectively to the first transmission input (or to the second transmission where present) and to the first electrical machine respectively. Alternatively, first and second dedicated radial drives may substitute the first and second accessory gearboxes respectively.

According to a second aspect, there is provided an aircraft comprising an aircraft cabin blower system according to the first aspect.

According to a third aspect, there is provided a method of operating an aircraft cabin blower system comprising a first transmission configured to receive power from a gas turbine engine, and an electrical circuit comprising a first electrical machine, a second electrical machine, and a power management system, the method comprising the steps of: when operating in a blower mode, providing mechanical power from a first part of the gas turbine engine to the first transmission in the form of a first transmission input; providing mechanical power from a second part of the gas turbine engine to the first electrical machine such that it operates as a generator, the first electrical machine providing electrical power to the power management system; providing electrical power from the power management system to the second electrical machine such that it operates as a motor, the second electrical machine providing mechanical power to the first transmission in the form of a second transmission input; driving a cabin blower compressor using the output of the first transmission.

The first part of the gas turbine engine may be a shaft associated with a first fan, e.g. a propulsive fan, or compressor. The second part of the gas turbine engine may be a shaft associated with a second fan, e.g. a propulsive fan, or compressor. The first fan or compressor may be at a different pressure stage from the second fan or compressor.

The first part of the gas turbine engine may be a shaft in communication with an intermediate-pressure compressor and the second part of the gas turbine engine may be a shaft in communication with a high-pressure compressor. In this case, mechanical power may be transmitted from the first part of the gas turbine engine to the first transmission via a second transmission in the blower mode, wherein the second transmission may be configured to provide any one of a plurality of discrete gear ratios thereof.

Alternatively, the first part of the gas turbine engine may be a shaft in communication with a high-pressure compressor and the second part of the gas turbine engine may be a shaft in communication with an intermediate-pressure compressor.

The method may further comprise the step of: when operating in a starter mode, providing electrical power from the power management system to the first electrical machine such that it operates as a motor, the first electrical machine providing mechanical power to the gas turbine engine to facilitate starting of the gas turbine engine.

The method may further comprise the step of: when operating in the starter mode, operating the cabin blower compressor as an expander to drive the first transmission, the first transmission providing mechanical power to the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
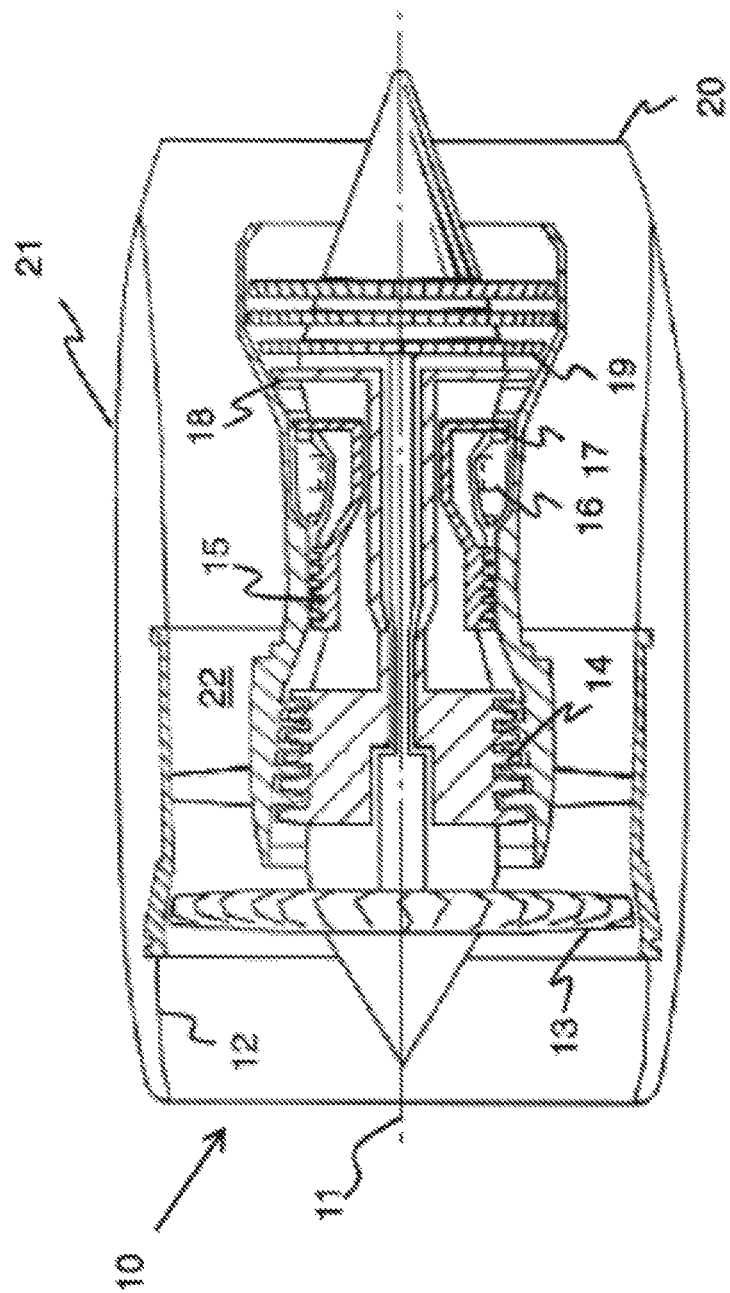
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate-pressure compressor 14, a high-pressure compressor 15, combustion equipment 16, a high-pressure turbine 17, an intermediate-pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate-pressure compressor 14 and a second air flow which passes through a bypass duct 22 to provide propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high-, intermediate- and low-pressure turbines 17, 18, 19 before being exhausted through the nozzle 20 to provide additional propulsive thrust. The high- 17, intermediate- 18 and low- 19 pressure turbines drive respectively the high-pressure compressor 15, intermediate-pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
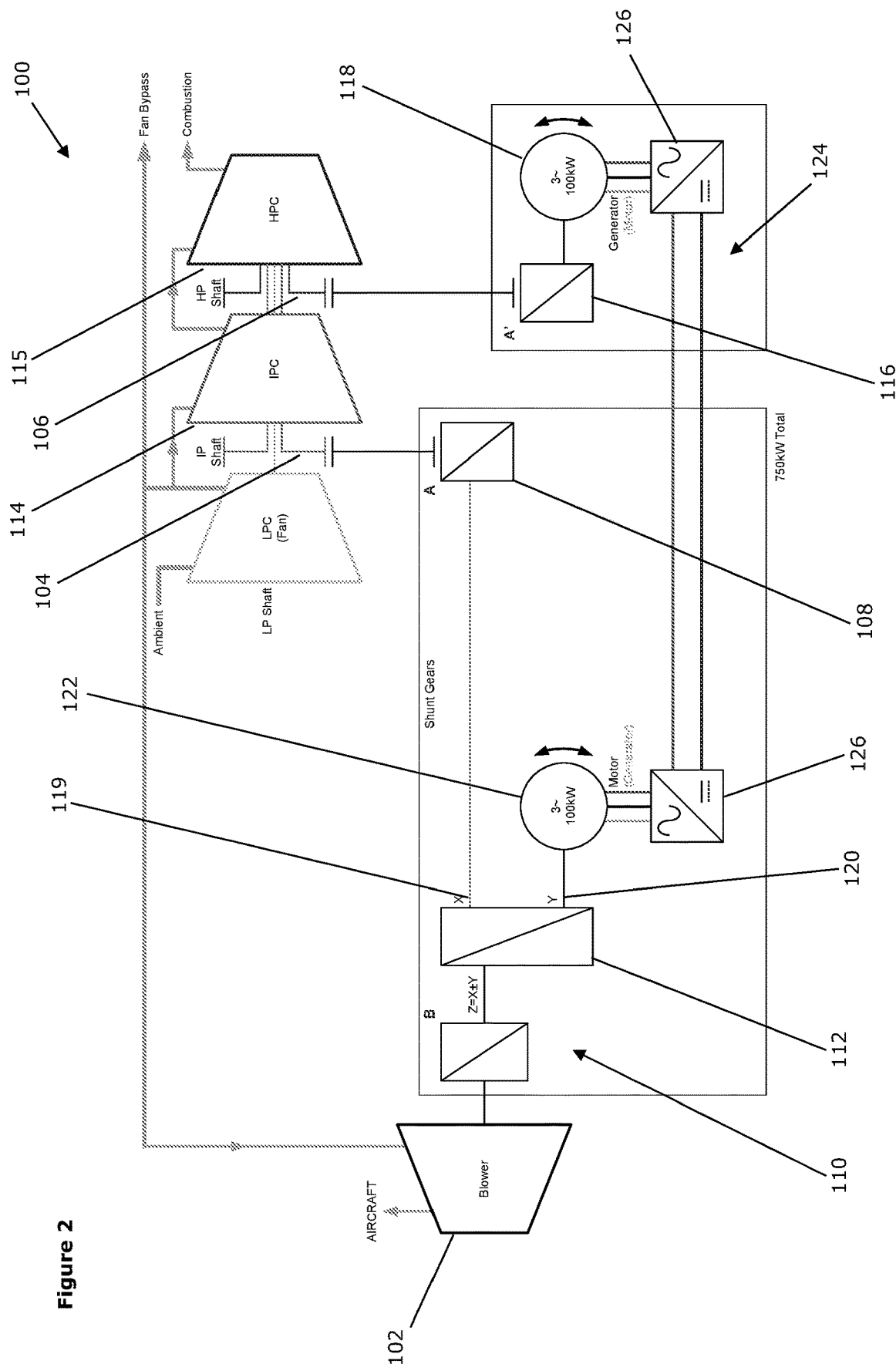
FIG. 2 is a schematic depiction of an aircraft cabin blower system in accordance with an embodiment of the disclosure.

Referring now to FIG. 2, a first embodiment of an aircraft cabin blower system 100 is depicted in schematic form. The cabin blower system 100 includes a cabin blower compressor 102 and power sources in the form of an intermediate-pressure shaft 104 of an intermediate-pressure compressor 114 and a high-pressure shaft 106 of a high-pressure compressor 115 of a gas turbine engine. The intermediate-pressure shaft 104 powers a first accessory gearbox 108 of the gas turbine engine, which, in turn, provides power to a transmission 110 of the cabin blower system 100. The transmission 110 comprises a summing epicyclic gearbox 112 with two inputs. A first input 119 of the epicyclic gearbox 112 is provided mechanically from the first accessory gearbox 108 to the epicyclic gearbox 112.

The high-pressure shaft 106 powers a second accessory gearbox 116 of the gas turbine engine, which, in turn, provides power to a first electrical machine 118. In a blower mode of the cabin blower system 100, the first electrical machine 118 operates as a generator to convert the mechanical power received from the second accessory gearbox 116 to electrical power.

A second input 120 of the epicyclic gearbox 112 is provided from a second electrical machine 122 which, in the blower mode of the cabin blower system 100, operates as a motor to convert electrical power to mechanical power, which is provided to the epicyclic gearbox 112.

A power management system 124 interconnects the first electrical machine 118 and second electrical machine 122. The power management system 124, in the present case, includes two AC/DC converters 126, one associated with each electrical machine 118, 122, the AC/DC converters 126 being interconnected. In the blower mode being described here, the power management system 124 receives electrical power from the first electrical machine 118 and sends said power to the second electrical machine 122. Thus, despite in this embodiment both the first electrical machine 118 and second electrical machine 122 being similar-sized motor-generators, the second electrical machine 122 can be driven as a motor at a different speed from the speed of the first electrical machine 118 acting as a generator at that time. Moreover, the power management system 124 can provide a continuously-variable difference between the power received from the first electrical machine 118 and the power output to the second electrical machine 122. For example, the first electrical machine 118 and the second electrical machine 122 may be 100 kW motor-generators.

It will be clear that the power management system 124 can include electrical storage, in the form of batteries or similar, that enables the power management system 124 to output more power than is being received by the power management system 124 at any moment. Such a system is shown in relation to the embodiment of FIG. 3, but could be introduced onto the embodiment of FIG. 2.

The epicyclic gearbox 112, as previously mentioned, is a summing epicyclic gearbox configured to have an output that is a function of the relative difference between the speeds of the first input 119 and the second input 120. In the present embodiment, the first input 119 is always positive, resulting in operation of the compressor 102. The second input 120, which can be rotated either positively or negatively by the second electrical machine 122, acts to provide either a positive or negative input to the epicyclic gearbox 112. Thus the output of the epicyclic gearbox 112 that feeds to the compressor 102 can be adjusted continuously by the operation of the second electrical machine 122 such that the output is greater or less than that which would be provided were the only input to the epicyclic gearbox 112 to be the first input 119. The function of the epicyclic gearbox 112 may result in the output being the actual difference of the first and second inputs 119, 120 or may otherwise be related to the difference by way of a ratio provided by the epicyclic gearbox 112, for example.

The operation of a summing epicyclic gearbox will be known to the person skilled in the art and therefore alternative implementations will be apparent. Moreover, other forms of summing gearbox may also be used, in addition to or as a replacement for the epicyclic gearbox depicted.

As the speed of the first and second accessory gearboxes 108, 116 may vary with operation of the gas turbine engine, the present embodiment can be operated to enable the output of the cabin blower compressor 102 to be at a speed required by an aircraft, to create the desired temperature, pressure, or air flow-rate. This can be managed without any power loss associated with bleed valves or other such features, although these could also be included for emergency operation, if required.

In addition to operation in the blower mode, the cabin blower system 100 can also be operated in a starter mode in order to provide mechanical input to the gas turbine engine to facilitate a start operation of the gas turbine engine. The cabin blower compressor 102 can operate in reverse as an expander to provide drive to the epicyclic gearbox 112 from a supply of compressed air.

The second electrical machine 122 can then be held still such that the transmission 110 transmits the mechanical power from the compressor 102 to the first accessory gearbox 108. The first accessory gearbox 108 will in turn cause the intermediate-pressure compressor 114 to rotate, which facilitates starting of the gas turbine engine. The remaining steps required for the successful ignition of a gas turbine engine will be known to the person skilled in the art and are therefore not discussed in the present application.

In addition to the input from the compressor 102, the first electrical machine 118, which operated in the blower mode as a generator, can be powered by the power management system 124 in order that it acts as a motor when in the starter mode. The mechanical power generated by the first electrical machine 118 can therefore be applied to the high-pressure compressor 115 to assist with engine start. As such, the present embodiment can provide drive to either or both of the intermediate-pressure compressor 114 and the high-pressure compressor 115.

Figure 3:
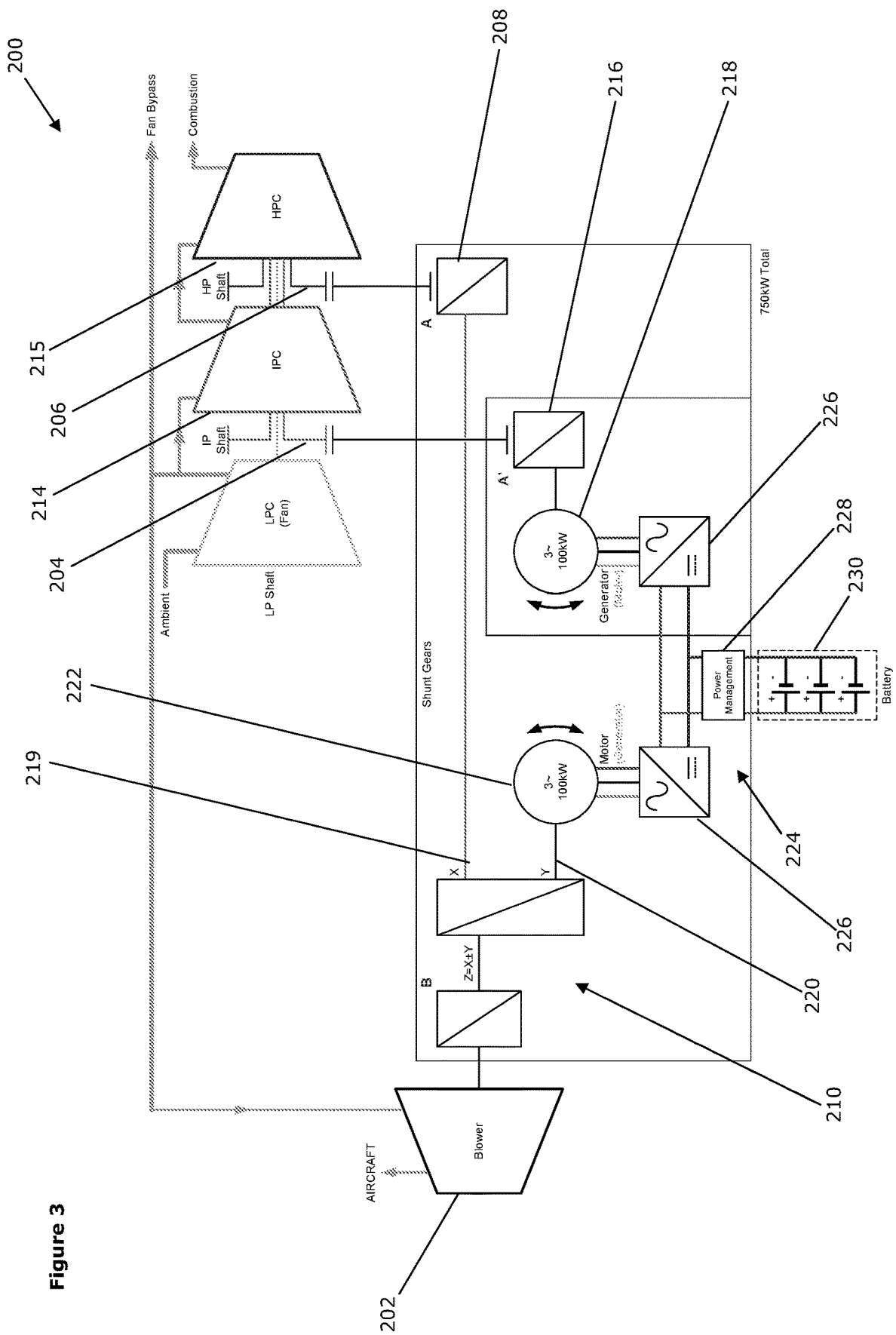
FIG. 3 is a schematic depiction of another aircraft cabin blower system in accordance with an embodiment of the disclosure.

A second embodiment of a cabin blower system 200 is depicted in simplified schematic form in FIG. 3. The second embodiment operates in much the same way as the first embodiment, differing in only some features. Therefore, for brevity, only the differences between the second embodiment and the first embodiment will be discussed in detail. Similar or identical reference numerals are used for similar or identical features.

In the second embodiment of the cabin blower system 200, when operating in the blower mode, a high-pressure shaft 206 drives a first accessory gearbox 208 to provide power to a transmission 210. An intermediate-pressure shaft 204 drives a second accessory gearbox 216 and thus a first electrical machine 218. Thus, the operation is reversed in that the power going to each of the first and second accessory gearboxes 208, 216 comes from the other shaft 204, 206 when compared with the first embodiment. In the starter mode, it will be apparent that a high-pressure compressor 215 is driven from the transmission 210 whilst an intermediate-pressure shaft 214 is driven from a second electrical machine 222 via the second accessory gearbox 216. In all other respects, the embodiment operates in the same way as the first embodiment.

In both embodiments, electrical starting can be carried out by one of the electrical machines 118, 122, 218, 222 acting on one of the intermediate-pressure 114, 214 and high-pressure compressors 115, 215, without the use of the cabin blower compressor 102, 202. Electrical starting can also be enabled by use of both electrical machines 118, 122, 218, 222, either directly through one of the accessory gearboxes 108, 116, 208, 216 or also through the transmission 110, 210, depending on the embodiment.

Alternatively, starting can be carried out by use of only the cabin blower compressor 102, 202 without the use of either electrical machine 118, 122, 218, 222.

As mentioned briefly above, a power management system 224 of the second embodiment includes a power management circuit 228 that coordinates power receipt and transmission from the AC/DC converters 226 associated with each of the first electrical machine 218 and second electrical machine 222. A battery 230 is also provided that enables power to be stored. This power can therefore be used during blower mode operation to allow the second electrical machine 222 to work as a motor with a greater power output than that being generated by the first electrical machine 218 at that moment. Additionally, the power management system 224 of the second embodiment allows starter mode operation using electrical power alone.

Figure 4:
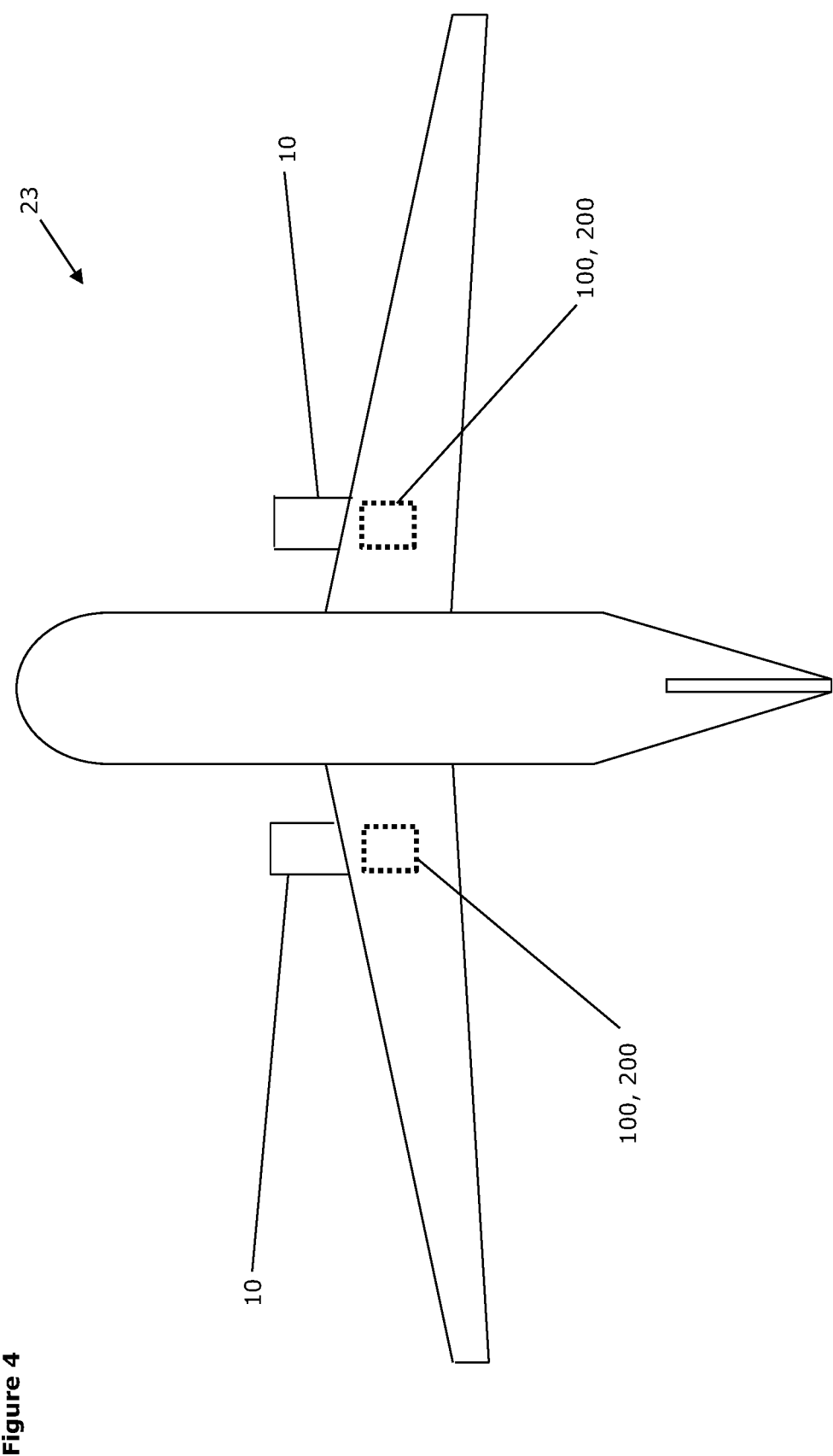
FIG. 4 is a plan view of an aircraft including a cabin blower system in accordance with the present disclosure.

Depicted in FIG. 4 is an aircraft 23 including two gas turbine engines 10 and two associated cabin blower systems 100, 200.

Figure 5:
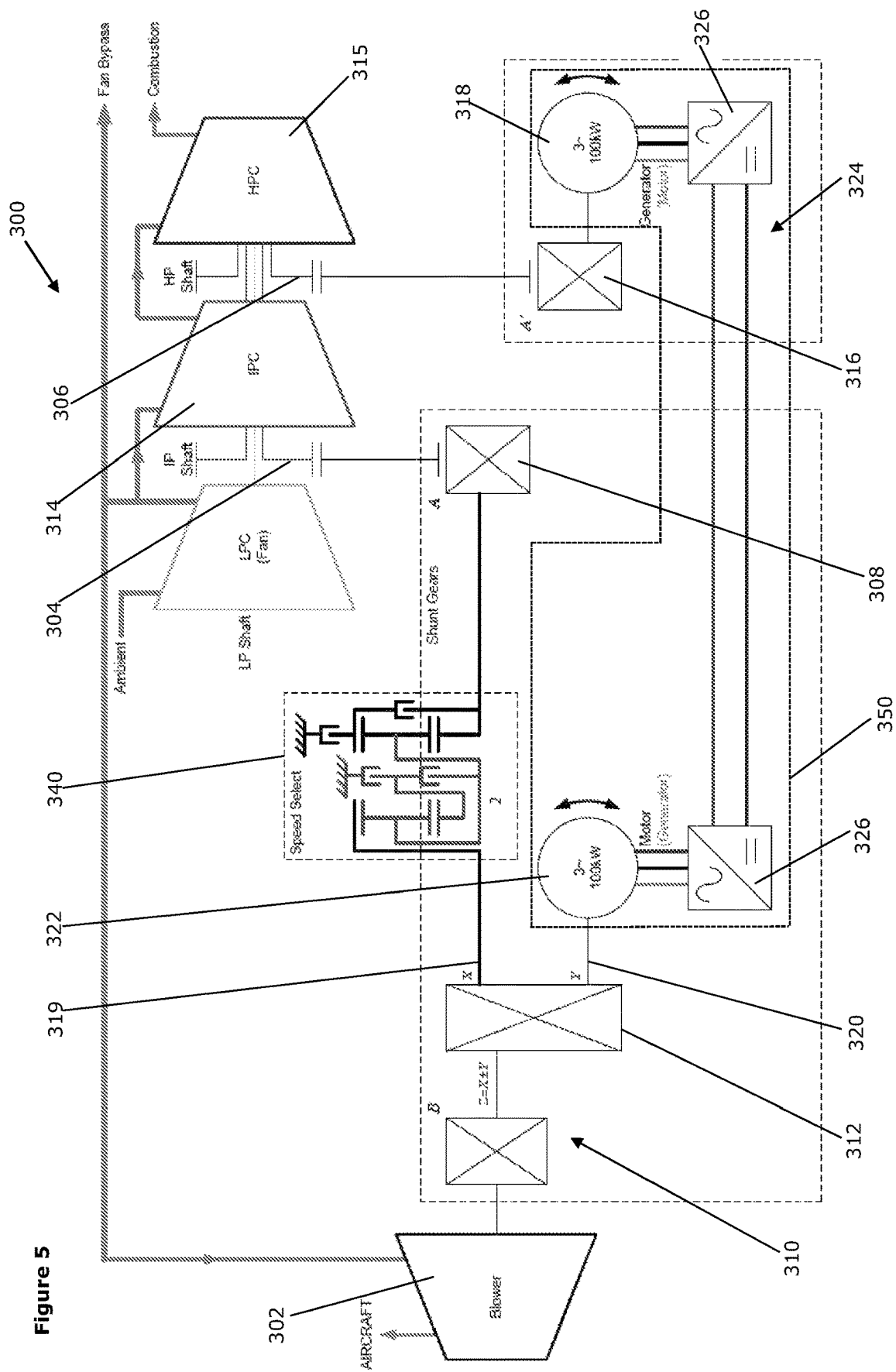
FIG. 5 is a schematic depiction of another aircraft cabin blower system in accordance with another embodiment of the disclosure.

FIG. 5 schematically depicts a third embodiment of an aircraft cabin blower system, indicated generally by 300. The system 300 is similar to the system 100 of FIG. 2; parts of the system 300 are labelled using reference numerals which differ by 300 from those labelling corresponding parts of the system 100 of FIG. 2. The system 300 comprises a transmission 340 arranged to transmit mechanical power from a first accessory gearbox 308 to a first input 319 of epicyclic gearbox 312 in a blower mode of the system 300, and from the first input 319 to the first accessory gearbox 308 in a starter mode of the system 300. The transmission 340 comprises a plurality of gears configured to be selectively engagable to provide any one of a plurality of fixed gear ratios of the transmission 340. First and second electrical machines 318, 322, converters 326 and power management system 324 collectively constitute a variator 350. In a blower mode of the system 300 of FIG. 5, the input speed to the first transmission input 319 of the epicyclic gearbox 312 may be varied in discrete steps by means of the transmission 340. The output speed of the transmission 340 is "trimmed" (adjusted) by the output speed of the variator 350 because the output speed of the epicyclic gearbox 312 (and hence the speed of the compressor 302) is the sum or difference of these two speeds.

By employing the transmission 340 together with the variator 350, the size and weight of the variator 350 may be reduced compared to those of equivalent parts of the system 100 of FIG. 2 because the maximum speed variation it is required to provide is smaller. The variation in the speed of the second transmission input 120 of the system 100 of FIG. 2 may need to be relatively large in order to provide sufficient variability in the speed of the compressor 102; the first and second electrical machines 118, 122, converters 126 and power management system 124 may therefore be relatively heavy and bulky compared to the variator 350. The inclusion of the transmission 340 also allows the system 300 to better adapt to the range of speeds of the intermediate-pressure shaft 304 compared to the ability of the system 100 to adapt to the range of speeds of the intermediate-pressure shaft 104. The ratio of the maximum speed of an intermediate-pressure shaft 104, 304 to its minimum speed may be 5:1 for example.

Increasing the number of discrete gears ratios of the transmission 340 allows the size and weight of the variator 350 to be reduced further since the range of output speeds which the variator 350 is required to generate is further reduced. In addition this allows relatively less power to be taken from the high-pressure shaft 306 and relatively more power to be taken from the intermediate-pressure shaft 104 improving engine fuel consumption.

Since the variator 350 is driven by high-pressure shaft 306, its speed increases with that of the high-pressure shaft 306 and electrical power is generated for the second electrical machine 322 as soon as, or before, it is required because the high-pressure shaft 306 always accelerates before the intermediate-pressure shaft 304. The intermediate-pressure shaft 304 is able to support higher power extraction than the high-pressure shaft 306; larger loads are therefore preferably taken from the intermediate-pressure shaft 304 with a smaller amount of mechanical power extraction from the high-pressure shaft 306 which runs faster than the intermediate-pressure shaft 304.

The overall mechanical power transmission efficiency between the accessory gearboxes 308, 316 and the epicyclic gearbox 312 is increased compared to the mechanical power transmission efficiency between the accessory gearboxes 108, 116 and epicyclic gearbox 112 in the system 100 of FIG. 2. This is because the transmission efficiency of the transmission 340 is close to 100%, so that the transmission efficiency from the first accessory gearbox 308 to the first transmission input 319 is also close to 100%, but the variator 350 (which may have a transmission efficiency of approximately 90%) carries a proportion of the total power extracted from the shafts 304, 306 which is smaller than the proportion of the total power extracted from shafts 104, 106 and carried by equivalent parts of the system 100 of FIG. 2.

In variants of the system 100 of FIG. 2, one or more of the accessory gearboxes 108, 116 is each replaced by a respective dedicated radial drive arranged to transmit mechanical power from the relevant engine shaft to either the first transmission input or the first electrical machine, as the case may be. Similarly, in variants of the system 200 of FIG. 3, one or more of the accessory gearboxes 208, 218 is each replaced by a respective dedicated radial drive arranged to transmit mechanical power from the relevant engine shaft to either the first transmission input or the first electrical machine, as the case may be. In variants of the system 300 of FIG. 5, one or more of the accessory gearboxes 308, 318 is each replaced by a respective dedicated radial drive arranged to transmit mechanical power from the relevant engine shaft to either the input of the second transmission or the first electrical machine, as the case may be. The variant systems may be useful in cases where an accessory gearbox is unavailable for use.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. An aircraft cabin blower system comprising:
    a first transmission configured to receive mechanical power from a first part of a gas turbine engine in the form of a first transmission input; and
    an electrical circuit comprising a first electrical machine, a second electrical machine, and a power management system,
    wherein an output of the first transmission is configured to drive a cabin blower compressor when operating in a blower mode, the first electrical machine being configured to receive mechanical power from a second part of the gas turbine engine and act as a generator to provide electrical power to the power management system, and the second electrical machine being configured to act as a motor providing mechanical power to the first transmission in the form of a second transmission input, the second electrical machine being driven by electrical power from the power management system.

2. An aircraft cabin blower system according to claim 1, wherein the first part of the gas turbine engine is a shaft associated with a first fan or compressor and/or the second part of the gas turbine engine is a shaft associated with a second fan or compressor.

3. An aircraft cabin blower system according to claim 1, wherein the first part of the gas turbine engine is a shaft associated with an intermediate-pressure compressor and the second part of the gas turbine engine is a shaft associated with a high-pressure compressor.

4. An aircraft cabin blower system according to claim 3 comprising a second transmission which may be configured to provide any one of a plurality of discrete gear ratios of the second transmission, the second transmission being arranged to transmit mechanical power from the first part of the gas turbine engine to the first transmission input in the blower mode.

5. An aircraft cabin blower system according to claim 1, wherein the first part of the gas turbine engine is a shaft associated with a high-pressure compressor and the second part of the gas turbine engine is a shaft associated with an intermediate-pressure compressor.

6. An aircraft cabin blower system according to claim 1, wherein, when operating in the blower mode, the speed of the output of the first transmission is determined by a relative difference of the mechanical power provided from the gas turbine engine and the second electrical machine to the first transmission.

7. An aircraft cabin blower system according to claim 1, further operable in a starter mode, wherein, when operating in the starter mode, the first electrical machine is configured to act as a motor to provide mechanical power to the gas turbine engine to facilitate starting of the gas turbine engine, the first electrical machine being driven by electrical power from the power management system.

8. An aircraft cabin blower system according to claim 1, further operable in a starter mode, wherein, when operating in the starter mode, the second electrical machine is configured to act as a motor to provide mechanical power to the gas turbine engine to facilitate starting of the gas turbine engine, the second electrical machine being driven by electrical power from the power management system.

9. An aircraft cabin blower system according to claim 1, the system comprising first and second accessory gearboxes arranged to transmit mechanical power from the first and second parts of the gas turbine engine respectively to the first transmission input and to the first electrical machine respectively in a blower mode of the system.

10. An aircraft cabin blower system according to claim 1, the system comprising first and second dedicated radial drives arranged to transmit mechanical power from the first and second parts of the gas turbine engine respectively to the first transmission input and to the first electrical machine respectively in a blower mode of the system.

11. An aircraft comprising an aircraft cabin blower system according to claim 1.

12. A method of operating an aircraft cabin blower system comprising a first transmission configured to receive power from a gas turbine engine, and an electrical circuit comprising a first electrical machine, a second electrical machine, and a power management system, the method comprising the steps of:
when operating in a blower mode,
providing mechanical power from a first part of the gas turbine engine to the first transmission in the form of a first transmission input;
providing mechanical power from a second part of the gas turbine engine to the first electrical machine such that it operates as a generator, the first electrical machine providing electrical power to the power management system;
providing electrical power from the power management system to the second electrical machine such that it operates as a motor, the second electrical machine providing mechanical power to the first transmission in the form of a second transmission input;
driving a cabin blower compressor using the output of the first transmission.

13. A method according to claim 12, wherein the first part of the gas turbine engine is a shaft associated with a first fan or compressor and/or the second part of the gas turbine engine is a shaft associated with a second fan or compressor.

14. A method according to claim 12, wherein the first part of the gas turbine engine is a shaft in communication with an intermediate-pressure compressor and the second part of the gas turbine engine is a shaft in communication with a high-pressure compressor.

15. A method according to claim 14 wherein mechanical power is transmitted from the first part of the gas turbine engine to the first transmission via a second transmission in the blower mode, and wherein the second transmission may be configured to provide any one of a plurality of discrete gear ratios thereof.

16. A method according to claim 12, wherein the first part of the gas turbine engine is a shaft in communication with a high-pressure compressor and the second part of the gas turbine engine is a shaft in communication with an intermediate-pressure compressor.

17. A method according to claim 12, further comprising the step of:
when operating in a starter mode, providing electrical power from the power management system to the first electrical machine such that it operates as a motor, the first electrical machine providing mechanical power to the gas turbine engine to facilitate starting of the gas turbine engine.

18. A method according to claim 17, further comprising the step of:
when operating in the starter mode, operating the cabin blower compressor as an expander to drive the first transmission, the first transmission providing mechanical power to the gas turbine engine.

19. A method according to claim 12, further comprising the step of:
when operating in a starter mode, providing electrical power from the power management system to the second electrical machine such that it operates as a motor, the second electrical machine providing mechanical power to the gas turbine engine to facilitate starting of the gas turbine engine.

\* \* \* \* \*